Figure 1:
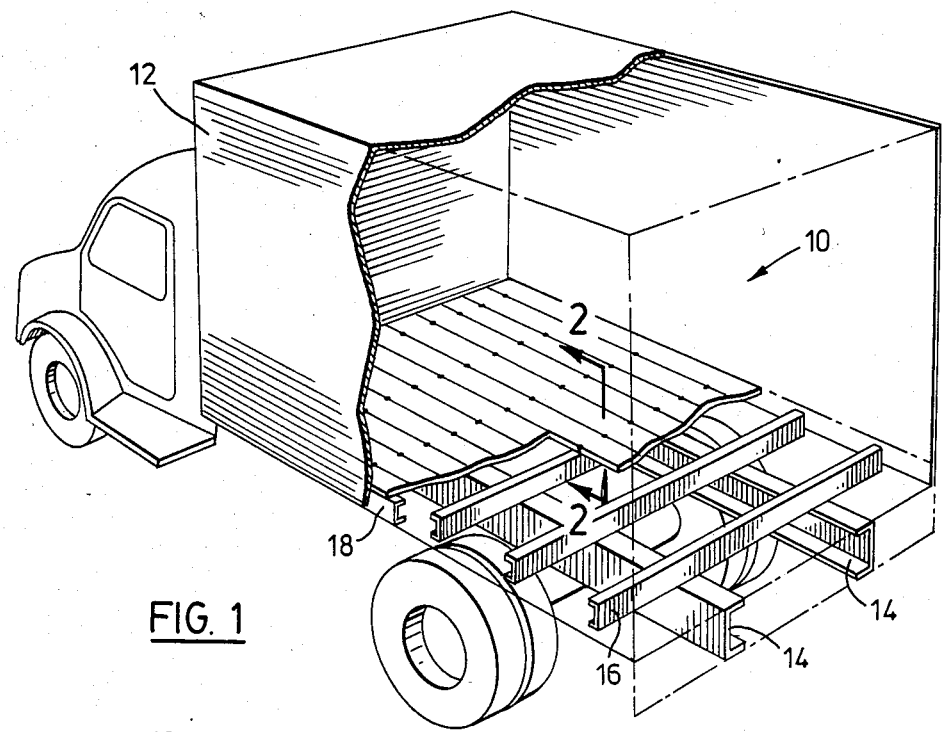

United States Patent [19]

Martin

[11] Patent Number: 4,526,418
[45] Date of Patent: Jul. 2, 1985

[54] TRUCK FLOOR BOARD CONSTRUCTION

[75] Inventor: John C. Martin, Toronto, Canada

[73] Assignee: Diesel Equipment Limited, Toronto, Canada

[21] Appl. No.: 596,312

[22] Filed: Apr. 3, 1984

[51] Int. Cl.$^3$ .............................................. B62D 25/20
[52] U.S. Cl. ..................... 296/182; 296/204; 105/422; 52/364; 52/483; 52/586; 403/294
[58] Field of Search ................... 296/182, 204; 52/364, 52/483, 586; 403/294, 292, 293, 331; 105/422

[56] References Cited

U.S. PATENT DOCUMENTS

| | | | |
|---|---|---|---|
| 1,402,146 | 1/1922 | Davis | 296/182 |
| 2,717,802 | 9/1956 | Martin | 296/182 |
| 2,752,013 | 6/1956 | Cole | 296/204 |
| 4,154,172 | 5/1979 | Curtis, Jr. | 52/483 |
| 4,352,520 | 10/1982 | Stiglmaier et al. | 296/182 |

Primary Examiner—Robert R. Song
Attorney, Agent, or Firm—Fetherstonhaugh & Co.

[57] ABSTRACT

An improved floor board construction for a truck or trailer has a floor boards which are each formed with a groove extending longitudinally of and opening laterally from each side edge thereof. The grooves of the butting side edges are aligned with one another to form a passage extending longitudinally of the floor boards. An elongated strap mounted in said passage and extends longitudinally thereof. The strap projects laterally into each oppositely disposed groove. A plurality of mounting passages open through the floor boards, strap and underlying cross members. A mounting screw is threaded into each mounting passage of said strap and its associated mounting passage of said cross member to secure said floor boards and mounting strap with respect to said cross members.

5 Claims, 2 Drawing Figures

U.S. Patent  Jul. 2, 1985  4,526,418

TRUCK FLOOR BOARD CONSTRUCTION

This invention relates to truck and trailer floors. In particular, this invention relates to an improved truck or trailer floor construction and method of assembling same.

PRIOR ART

Truck and trailer floor boards have been made from wooden floor boards arranged in a side by side relationship and secured to floor cross members by mounting screws for many years. The wooden floor boards are exposed to the moisture, dirt and dust thrown up by the truck or trailer as it travels along various road surfaces. The repeated soaking and drying of the floor boards along with normal shrinkage of wood tends to cause the floor boards to come apart and thereby form openings at the seams formed between adjacent floor boards. This opening of the seams permits moisture, dirt and dust to pass through the floor boards into the container body.

While the use of tongue and groove boards may serve to reduce the formation of gaps between adjacent floor boards, I have found that the boards tend to become warped and distorted between adjacent mounting screws and this distortion can be so great as to damage or destroy the tongues or side walls of the grooves thereby reducing the effectiveness of the tongue and groove construction.

The mounting screws which are commonly used in floor board construction provide for localized retention of the floor boards and do not serve to distribute the mounting forces over any substantial length of the floor boards and for this reason, substantial distortion of the floor boards can occur without difficulty.

I have found that the difficulties described above can be substantially overcome by providing a mounting strap disposed in grooves which are disposed opposite one another in the abutting side edges of the floor boards and by securing the mounting strap with respect to the underlying cross members and fabricating the strap so that it extends longitudinally of the groove to distribute the mounting load along the length of the floor boards.

SUMMARY OF INVENTION

According to one aspect of the present invention, there is provided in a truck or trailer having a floor board construction consisting of a plurality of floor cross members and a plurality of floor boards each having oppositely disposed longitudinal side edges, the floor boards being laid on the cross members with their side edges butting one another, the improvement of a groove extending longitudinally of and opening laterally from each butting longitudinal side edge of each floor board, the grooves of the butting side edges being aligned with one another to form a passage extending longitudinally of said floor boards, an elongated strap mounted in said passage and extending longitudinally thereof, said strap projecting laterally into each oppositely disposed groove, a plurality of mounting passages opening through said floor boards, strap and underlying cross members, a mounting screw in each mounting passage, said mounting screw being threaded into its associated mounting passage of said strap and its associated mounting passage of said cross member to secure said floor boards and mounting strap with respect to said cross members.

According to a further aspect of the present invention, there is provided a method of forming a floor of a truck or trailer having a plurality of floor cross members each having a groove extending along each side edge thereof comprising the steps of laying a first floor board in an opposite position on said cross members with the groove of one longitudinal side edge exposed, inserting an edge of a longitudinally elongated strap into said exposed groove, laying a second floor board side by side said first floor board with said strap extending into the oppositely disposed groove of said second floor board and the side edges of said floor boards butting one another, drilling a plurality of mounting holes through said floor boards at the butting edges thereof and through said strap and underlying cross members, mounting self-tapping mounting screws in each mounting passage, said screws being threadedly mounted in said straps and cross member thereby to retain a constant spacing therebetween, and repeating these steps to form a complete floor.

PREFERRED EMBODIMENT

Figure 2:
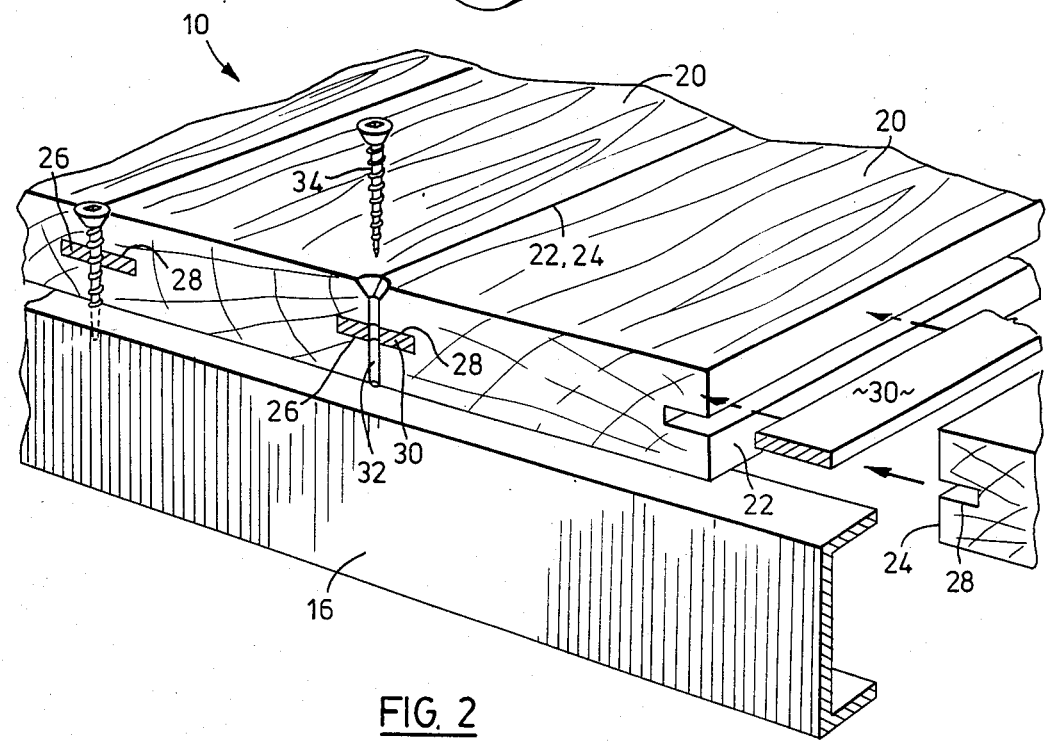

The invention will be more clearly understood after reference to the following detailed specification read in cojunction with the drawings wherein;

FIG. 1 is a partially sectioned pictorial view of a truck having a floor constructed in accordance with an embodiment of the present invention, FIG. 2 is a cross-sectional view taken through a portion of the floor of FIG. 1 in the direction of the arrows 2—2 of FIG. 1.

With reference to the drawings, the reference numeral 10 refers generally to a truck floor board assembly. The truck 12 has a pair of chassis beams 14 extending longitudinally thereof. A plurality of U-shaped joists or cross members 16 are mounted at spaced intervals along the length thereof with the opposite ends of the cross members being secured to longitudinal seals 18. The cross members 16 are of a conventional rolled steel construction and are secured to the beams 14 by means of suitable mounting bolts or by welding in a conventional manner.

A plurality of wooden floor boards 20 are provided. Each floor board 20 has oppositely disposed side edges 22 and 24 in which grooves 26 and 28 are formed. A flat strap 30 is proportioned to fit in a close fitting relationship within grooves 26 and 28 when the sidefaces 22, 24 are disposed in an abutting relationship. The straps 30 preferably have a sufficient length to extend over the full length of the floor boards from the front end to the back end of the floor so as to form a continuous seal extending the full length of the floor boards. The strap 30 is preferably made from flat road steel.

A plurality of mounting passages 32 are formed at spaced intervals along the length of the floor boards at the interface between the abutting side edges 22,24. The mounting passages 32 extend through the floor boards, the strap 30 and the underlying cross member 16. Self-tapping mounting screws 34 are threadedly mounted in each mounting passage 32. The threads of the self-tapping screw 34 form threads in the passages formed in the mounting strap 30 and in the cross member 16. I have found that the self-tapping metal screws can be tightened to draw the mounting strap 30 toward the cross members 16 to an extent sufficient to clamp the floor boards firmly against the cross members 16. The clamping load is believed to be primarily carried by the strap 30 and is distributed along the length of the grooves 26 and 28, thereby serving to restrain the floor boards against distortion. The strap 30 has a sufficient width to bridge the interface even after substantial shrinkage of the floor board occurs and to provide a continuous seal extending the full length of the floor boards at the interface.

In use, a first floor board is initially laid down in an operative position on the cross members. A strap 30 is located in the groove of the first floor board and a second floor board is laid down in an edge to edge relationship with the first floor board with the strap 30 extending into each adjacent groove 26,28 and the side edges 22 and 24 butting one another. The mounting passages 32 are then drilled at spaced intervals along the length of the floor boards. This process is repeated until all of the floor boards have been laid down and secured.

Various modifications will be apparent to those skilled in the art without departing from the scope of the invention. For example the strap 30 may be made from steel, aluminum or a plastics material such as Nylon or the like. The strap is preferably a simple flat strap which is available as an inexpensive stock item.

From the foregoing, it will be apparent that the present invention provides a simple and inexpensive floor board construction which serves to minimize floor board distortion and to maintain a seal at the floor board joints.

I claim:

1. In a truck or trailer having a floor board construction consisting of a plurality of floor cross members and a plurality of floor boards each having oppositely disposed longitudinal side edges, the floor boards being laid on the cross members with their side edges butting one another, the improvement of;
   a. a groove extending longitudinally of and opening laterally from each butting longitudinal side edge of each floor board, the grooves of the butting side edges being aligned with one another to form a passage extending longitudinally of said floor boards,
   b. an elongated strap mounted in said passage and extending longitudinally thereof, said strap projecting laterally into each oppositely disposed groove,
   c. a plurality of mounting passages opening through said floor boards, strap and underlying cross members,
   d. a mounting screw in each mounting passage, said mounting screw being threaded into its associated mounting passage of said strap and its associated mounting passage of said cross member to secure said floor boards and mounting strap with respect to said cross members.

2. The improvement of claim 1 wherein said elongated strap is a metal strap and said mounting screws are self-tapping metal screws.

3. The improvement of claim 2 wherein said floor boards are wooden boards.

4. The improvement of claim 1 wherein said strap has a lengthy equal to the length of said floor boards thereby to seal the interface between said butting edges over the full length of said boards.

5. A method of forming a floor of a truck or trailer having a plurality of floor cross members each having a groove extending along each side edge thereof comprising the steps of;
   a. laying a first floor board in an opposite position on said cross members with the groove of one longitudinal side edge exposed,
   b. inserting an edge of a longitudinally elongated strap into said exposed groove,
   c. laying a second floor board side by side said first floor board with said strap extending into the oppositely disposed groove of said second floor board and the side edges of said floor boards butting one another.
   d. drilling a plurality of mounting holes through said floor boards at the butting edges thereof and through said strap and underlying cross members,
   e. mounting self-tapping mounting screws in each mounting passage, said screws being threadedly mounted in said straps and cross member thereby to retain a constant spacing therebetween, and repeating steps b, c, d and e to form a complete floor.

* * * * *